Aug. 5, 1969     W. C. SHEPHEARD     3,459,134
RACK RAIL AIRCRAFT MOVING LOCOMOTIVE
Filed July 24, 1967     2 Sheets-Sheet 1
FIG. 1
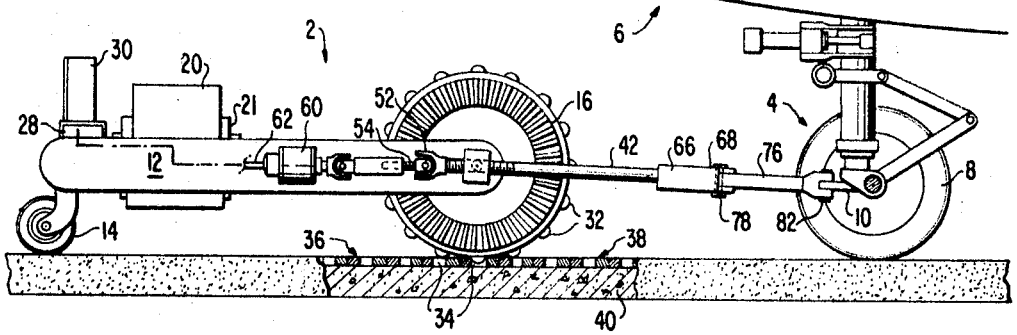
FIG. 2
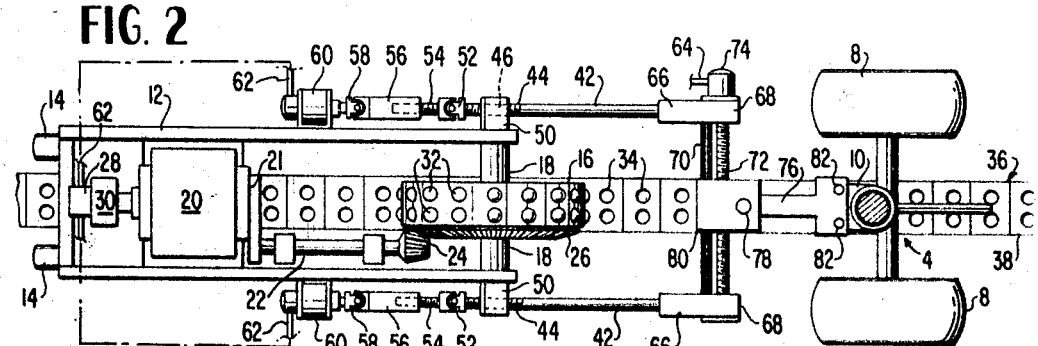
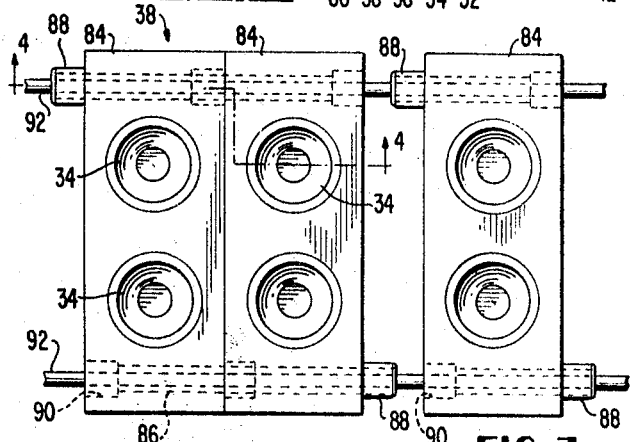
FIG. 3
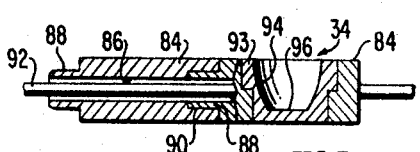
FIG. 4
FIG. 5
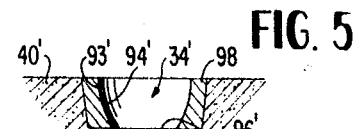
FIG. 6
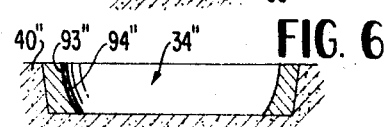
FIG. 7
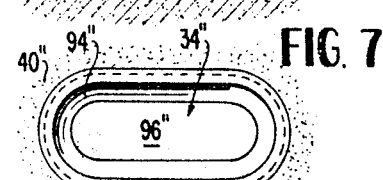
INVENTOR
WILSON C. SHEPHEARD
BY *James H. Littlepage*
ATTORNEY United States Patent Office 3,459,134
Patented Aug. 5, 1969

3,459,134
RACK RAIL AIRCRAFT MOVING LOCOMOTIVE
Wilson C. Shepheard, 3040 Virginia Beach Blvd., Norfolk, Va. 23509
Filed July 24, 1967, Ser. No. 655,620
Int. Cl. B61b *13/02;* B61c *13/02, 11/04*
U.S. Cl. 104—1                           12 Claims

ABSTRACT OF THE DISCLOSURE

A jumbo aircraft mover has a roller provided with lugs. In the ground or pavement along which the wheel rolls there is provided a series of sockets in the upper plane of the ground or pavement along the path to be followed by the roller. The roller is driven by a suitable source of power, preferably through reduction gears, so as to apply high torque. A chassis for the roller is coupled through lengthwise-adjustable arms to the landing gear of the aircraft. As the roller rolls along the path, the lugs engage in the sockets in the ground so as to prevent slippage. The ground sockets are arranged in a path to effect desired steering of the aircraft; additional steering of the aircraft may be accomplished by transverse adjustment of linkage which connect the chassis to the aircraft.

Background of invention

Field.—The invention falls within the class of motor vehicles, special driving devices, with certain characteristics of railway rolling stock, rack rail locomotives.

Prior art.—Most jumbo aircraft movers rely upon weight and tire tread for traction. However, the traction required for aircraft now being produced is so great that movers relying upon weight will be impractical from the standpoint of size and cost. A few aircraft movers utilize suction ground-effects; and rack-rail moving devices such as those used for moving freight cars entail the use of rails, which would impede the free rolling of the aircraft wheels along the ground.

The object of this invention is to provide a jumbo aircraft mover, having traction far exceeding the demands of moving even the largest aircraft now on the drawing boards, the driving element or roller of which rolls along a path defined by a series of sockets in the ground, wherein the roller has around its periphery one or more sets of lugs which engage in the sockets. In a typical air terminal the aircraft move nose-first into positions where passengers get on or off. When an aircraft is ready to depart, and particularly if it be a large one, it is usually necessary for it to be backed off and turned before it can move out under its own power. The object here is to provide a device for pushing or pulling an aircraft back and for turning it. Among the more specific objects is the provision for engaging the landing gear of an aircraft, even though the aircraft be out of position, on one side or the other, with respect to the traction pathway for the moving device. Another object is to provide means for steering an aircraft wheel, such as the nose wheel, so that the aircraft may be guided into and maintained along a desired travel path.

Still another object is to provide, in combination with an aircraft mover having a roller with a series of traction lugs on it, a trackway comprising at least one series of sockets in the ground, wherein the sockets are reinforced to prevent the lugs from digging out, and wherein the sockets and the material which defines them can be heated so as to melt away any ice or snow which might otherwise accumulate therein. A further object is to form the sockets in trackway sections which can be easily installed in the ground, and to provide sockets which can be easily replaced should the reinforcing material defining the sockets wear.

These and other objects will be apparent from the following specification and drawings, in which:

FIG. 1 is a side elevation, partly in vertical cross-section, of the aircraft mover engaged with the nose wheel landing gear of a typical jumbo aircraft;

FIG. 2 is a top plan view of the assembly shown in FIG. 1;

FIG. 3 is a top plan view of two assembled socket sections and a third section about to be engaged therewith;

FIG. 4 is a vertical cross-section along the lines 4—4 of FIG. 3;

FIGS. 5 and 6 are vertical cross-sections through alternate socket constructions;

FIG. 7 is a plan view of the socket shown in FIG. 6; and

Figure 8:
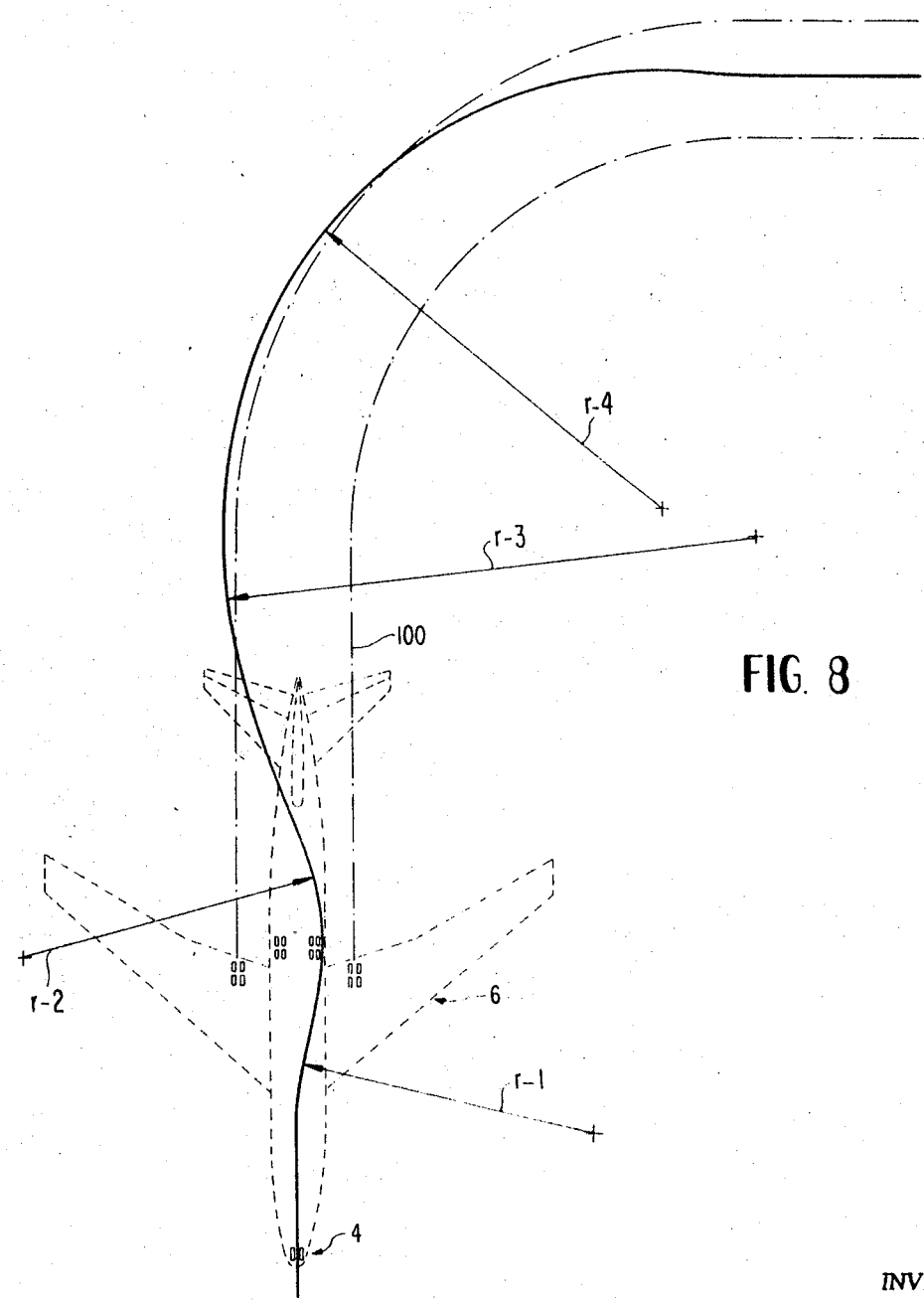
FIG. 8 is a diagrammatic plan view of a socket pathway usable for backing a jumbo aircraft around a turn.

Referring now to the drawings, in which like reference numerals denote similar elements and prime reference numerals denote modifications previously designated with simple numerals, the aircraft mover 2 is designed for engagement with the landing gear 4 of a jumbo aircraft 6 of the type presently under construction, the details of which are not important other than to observe that one presently under construction is planned to weigh about 680,000 pounds, which is far too heavy to be moved by presently available movers unless they be of such size and weight as to be prohibitive in cost and of such mass as to be uneconomical and unwieldy. As presently designed, one of such aircraft is to have, on the landing gear of its nose wheels 8 an apertured lug 10 adapted to be engaged by a mover, although it is to be understood that the subject mover may engage the aircraft elsewhere as, for example, at the rearward landing gear. For purposes of exposition, however, it will be assumed that the mover 2 is to engage the nose wheel landing gear 4 and that the latter is steerable.

Mover 2, which is shown in elemental form, comprises a chassis 12 supported by casters 14 at its rear, and a roller 16 rotatably supported by bearings 18 towards its front. On chassis 12 is an engine 20 which drives through a clutch and gear box 21 to a drive shaft 22. The drive train includes a suitable clutch and forward-reverse shifting means which are not shown because they are conventional and well known in the transmission art. On drive shaft 22 is a spur gear 24 which drives a ring gear 26 on roller 16 so that, upon energization of engine 20, roller 16 will be slowly driven with high torque in one direction or the other. Engine 20 also drives a hydraulic pump 28 having a suitable hydraulic system control box 30 selectively providing pressure and return fluid to the various hydraulic motors.

Around the periphery of roller 16 are two circumferential series of lugs 32 shaped to engage into sockets 34 arranged along a pathway 36. As will be apparent hereinafter, the sockets 34 along pathway 36 may be variously formed, for example, in a metal strip 38 firmly mounted in a concrete base 40, or they may be in metal inserts set directly into a concrete base.

Extending forwardly from chassis 12 on opposite sides thereof are a pair of arms 42 in the form of rods having thereon threads 44 which engage through nuts 46, which are pivotally affixed in brackets 50 on chassis 12. Arms 42 are connected through universal joints 52 to spline shafts 54 telescoping in internally splined sleeves 56. Sleeves 56 are connected via universal joints 58 to reversible hydraulic motors 60 which are simultaneously motivated, via conventional hose lines 62 and hydraulic system control box 30, by hydraulic pump 28. Thus the lengths of arms 42 may simultaneously be similar adjusted to effect final positioning, back or forth, of the coupling with the aircraft.

The forward ends of arms 42 are rotatably connected through sleeve joints 66 to end pieces 68 between which is affixed a splined cross bar 70, and between which end pieces there is rotatably mounted a screw shaft 72. Screw shaft 72 is selectively rotated in one direction or the other by a reversible hydraulic motor 74 connected by hose lines 64 to the hydraulic system control box 30 so that screw shaft 72 can be caused to turn in one direction or the other by the operator of the mover.

At the front end of mover 2 is a forwardly extending drawbar tongue 76 pivoted at 78 to an internally splined collar 80 which engage around splined cross bar 70 and which also has a nut (not shown) which threadedly engages screw shaft 72. The front end of tongue 76 engages the lug 10 on the nose landing gear 4 by means of pins 82.

If landing gear 4 is not directly centered over pathway 36, hydraulic motor 74 may be operated in one direction or the other so as to screw the link 76 to the left or the right and thus line up the tongue directly with the center of the landing gear. If it is desired to steer the nose wheels, hydraulic motor 74 may be actuated in one direction or the other so as to swing the rear end of tongue 76 off to one side or the other, and steering can also be accomplished by providing curves in pathway 36 as later described.

FIGS. 4 and 5 illustrates one form in which strip 38, which extends along pathway 36, may be formed. In this example, strip 38 comprises a series of metal plates 84 having hollow conduits 86 runnning along opposite sides. Conduits terminate at one end in a hollow male protuberance 88 which mates with a female socket 90 on the next plate. Electrical resistance cables 92 run through conduits 86 so as to heat the plates and melt off ice and snow which otherwise might clog up sockets 34. Sockets 34 may be formed with straights 93 at their tops, concave sides 94 and flat bottoms 96, with which lugs 32 on roller 16 mate. The precise shape of sockets 34 and lugs 32 may vary, so long as the lugs roll easily into and out of the sockets, and so long as maximum traction between roller 16 and pathway 36 is provided. Where pathway 36 is other than straight, plates 84 may be formed slightly wedge-shape or they may be shimmed on one side or the other so as to form a turn and to slightly decrease the distance between the sockets 34 along one row relative to the distance between the sockets on the other row. For turning a jumbo aircraft, such as a Boeing 747 which is to be over 231 feet long, the turns in pathway 36 are so gradual that only a small fraction of an inch difference between each adjacent pair of sockets 34 on one row relative to those on the other row is needed to execute the turn; and this difference in socket spacing is so small that the lugs 32 will nest in the sockets and thereby turn roller 16 ever so slightly with each increment of rolling movement, and thereby steer landing gear 4. By providing at least two rows of sockets and two rows of lugs on the roller, the mover is prevented from turning at an angle to the pathway.

Instead of forming sockets 34 in plates 84, sockets 34' may be individually formed by metal inserts 98 set into a concrete base 40', as shown in FIG. 5. Also, the sockets may be other than round. FIGS. 6 and 7 show oval sockets 34", in which case lugs 32 would be complementarily sloped.

FIG. 8 illustrates a typical mover pathway 36 for moving aircraft 6 around a turn 100. Pathway 36, along which the sockets previously described extend, would undergo a series of turns along radii $r$-1, $r$-2, $r$-3 and $r$-4 so that mover 2, following along the pathway, would steer the aircraft smoothly around the turn. If, at the outset, the aircraft is not quite centered over the socket pathway, it can be brought back into alignment by steering, by operating hydraulic motor 74.

As previously noted, mover 2 is shown in elemental form, it being understood that the chassis may be considerably different in appearance, and operator station may be provided, ballast weight may be added, and mover 2 might be controlled from still another vehicle to which the hydraulic and transmission controls extend.

I claim:
1. An aircraft mover, comprising:
a chassis,
ground-engaging roller means on said chassis,
power means drivingly connected to said roller means for rolling the latter along the ground,
lug means spaced around the periphery of said roller means, a rack positioned in the surface of the plane of the ground, comprising upwardly open socket means spaced along a pathway for receiving the lug means on the roller means as the latter rolls along the pathway, said lug means, in engaging said socket means, extending through the plane of the ground upon which said roller means rolls and, together with said socket means, constituting the sole guide means for the mover, and
means on the chassis for engaging an aircraft.
2. The combination claimed in claim 1,
there being at least two axially-spaced annular series of said lug means on said roller means, and there being at least two laterally spaced rows of said socket means,
whereby to prevent said mover from turning with respect to said pathway.
3. The combination claimed in claim 2,
said pathway extending along an arc of a radius,
wherein one row of socket means is disposed radially outward of the other row,
the distance between the socket means on the other row being greater than the distance between the socket means on the inner row,
whereby said roller means is caused to follow said pathway around said arc.
4. The combination claimed in claim 1,
said socket means being formed in metal members anchored to the ground and having their uppermost portions substantially flush with the ground.
5. The combination claimed in claim 4,
and means for heating said metal members, whereby to melt ice or snow in said socket means.
6. The combination claimed in claim 4,
said metal members comprising metal plates anchored in a concrete base,
said plates being disposed side-by-side along said pathway,
and mating joints connecting the sides of adjacent plates to one another,
whereby to form a continuous row of said plates along said pathway.
7. The combination claimed in claim 4,
said metal members comprising metal inserts set in a concrete base in the ground.
8. The combination claimed in claim 4,
said socket means having inwardly concave side walls and flat bottoms,
said lug means being complementary in shape with said socket means.
9. The combination claimed in claim 1,
said means for engaging an aircraft comprising a drawbar extending outwardly from one end of said chassis,
and means for extending and retracting said drawbar inwardly and outwardly with respect to said chassis.
10. The combination claimed in claim 1,
said means for engaging an aircraft comprising a drawbar connected to one end of the chassis, and
means for moving said drawbar transversely of said chassis.
11. The combination claimed in claim 1,
said means for engaging the aircraft comprising a tongue having an inner end connected to one end of the chassis and another end extending outwardly therefrom in the longitudinal direction in which the roller rolls, and means for moving the inner end of the tongue transversely of the chassis.

12. In the combination claimed in claim 1, said means for engaging the aircraft comprising a drawbar being connected to one end of the chassis, means for extending and retracting said drawbar outwardly and inwardly with respect to the chassis, and means for moving said drawbar transversely of said chassis.

References Cited

UNITED STATES PATENTS

| | | | |
|---|---|---|---|
| 595,165 | 12/1897 | Fairchild | 105—29 |
| 772,679 | 10/1904 | Sperry | 105—29 |
| 901,975 | 10/1908 | Lynch | 105—29 |
| 1,223,505 | 4/1917 | Martin | 180—14 |
| 1,523,363 | 1/1925 | Howell | 105—29 |
| 2,734,716 | 2/1956 | Pearne | 254—1 |
| 2,845,237 | 7/1958 | Doolittle et al. | 244—63 |
| 2,894,766 | 7/1959 | Habriga | 280—482 |
| 3,178,203 | 4/1965 | Elliott | 280—470 |
| 3,391,948 | 7/1968 | McCown | 280—468 XR |

FOREIGN PATENTS 734,062  7/1932  France.

ARTHUR L. LA POINT, Primary Examiner

H. BELTRAN, Assistant Examiner

U.S. Cl. X.R.

104—165; 105—29; 180—14; 244—50, 63; 254—1, 95; 280—468, 470, 482